(12) United States Patent
Lee et al.

(10) Patent No.: US 7,089,436 B2
(45) Date of Patent: Aug. 8, 2006

(54) POWER SAVING METHOD AND ARRANGEMENT FOR A CONFIGURABLE PROCESSOR ARRAY

(75) Inventors: Ming-Hau Lee, Irvine, CA (US); Fadi Kurdahi, Irvine, CA (US)

(73) Assignee: Morpho Technologies, Irvine, CA (US)

( * ) Notice: Subject to any disclaimer, the term of this patent is extended or adjusted under 35 U.S.C. 154(b) by 471 days.

(21) Appl. No.: 09/776,981

(22) Filed: Feb. 5, 2001

(65) Prior Publication Data

US 2002/0108063 A1   Aug. 8, 2002

(51) Int. Cl.
G06F 1/32 (2006.01)
G06F 1/04 (2006.01)

(52) U.S. Cl. ...................... 713/320; 713/500
(58) Field of Classification Search ........ 713/300, 713/500, 320
See application file for complete search history.

(56) References Cited

U.S. PATENT DOCUMENTS

| | | | |
|---|---|---|---|
| 4,907,148 A * | 3/1990 | Morton | 712/22 |
| 4,920,497 A * | 4/1990 | Upadhyaya et al. | 716/17 |
| 5,615,162 A * | 3/1997 | Houston | 365/226 |
| 5,892,729 A * | 4/1999 | Holder, Jr. | 365/233 |
| 5,915,123 A | 6/1999 | Mirsky et al. | |
| 5,986,969 A | 11/1999 | Holder, Jr. | |
| 6,073,185 A | 6/2000 | Meeker | |
| 6,108,760 A | 8/2000 | Mirsky et al. | |
| 6,122,719 A | 9/2000 | Mirsky et al. | |
| 6,205,537 B1 * | 3/2001 | Albonesi | 712/43 |
| 6,553,525 B1 * | 4/2003 | Shephard, III | 714/733 |
| 6,848,058 B1 * | 1/2005 | Sinclair et al. | 713/322 |

FOREIGN PATENT DOCUMENTS

JP        06103249 A  *  4/1994

* cited by examiner

*Primary Examiner*—A. Elamin
*Assistant Examiner*—Eric Chang
(74) *Attorney, Agent, or Firm*—DLA Piper Rudnick Gray

(57) ABSTRACT

A method and arrangement for reducing power consumption in an M row×N column array of processing cells. A row mask register masks individual cells in each row for being enabled. A column mask register masks individual cells in each column for being enabled. The combination of the row mask register signal and column mask register signal enables or disables each cell of the array. Enabled cells are activated to execute an operation or function, while disabled cells a prevented from consuming dynamic power. Depending on the application and enabled cells thereby, power consumption is reduced.

15 Claims, 3 Drawing Sheets

POWER SAVING METHOD AND ARRANGEMENT FOR A CONFIGURABLE PROCESSOR ARRAY

BACKGROUND OF THE INVENTION

The present invention relates generally to computer processors. More specifically, the present invention relates to power savings with an array structure of processor cells.

A processing cell contains logic elements for executing an operation on data according to an instruction. Increasingly, larger numbers of processing cells are connected together in one processor to accomplish a greater number of more complex processing tasks. For instance, a processor having cells that are arranged in an array of M rows and N columns is capable of processing M×N operations during each clock cycle. Further, each cell in the array can be individually programmed to perform a unique operation, such that the processor could accomplish M×N different operations during a single clock cycle.

In digital systems, dynamic power consumption dominates a system's overall power consumption. Each cell consumes dynamic power in two ways: when its input is changing, and when its internal registers are clocked. Some processing applications require only a portion of the number of cells in a processor to execute a particular function. However, a cell that is not being used for a certain application will still consume dynamic power by having its registers continually clocked while it awaits to be enabled.

Some uses for processors, such as in a handheld computing device or wireless communication device for example, benefit from reduced power consumption. Reduced power consumption allows for a smaller power supply, and thus a more efficient design of such devices. Also, a device with reduced processor power consumption can achieve a longer battery life. Accordingly, there exists a need for a method and arrangement for saving power in a processor.

SUMMARY OF THE INVENTION

This invention relates to processing architectures and methods of controlling processing cells. In an embodiment of the invention, an M×N array of processor cells includes control and logic circuitry for dynamic reconfiguration of individual cells, whereby a subset of cells is masked and enabled and the remaining unmasked cells are disabled. The enabled cells are activated to accomplish a processing application, and the disabled cells do not consume dynamic power. In this manner, power consumption for the array is reduced, depending on the application.

This invention, embodied as a method, includes the steps of providing a row mask signal configured to enable selected cells in each row of the array, and providing a column mask signal configured to enable selected cells in each column of the array. The method further includes the step of gating the row mask signal and column mask signal with a clock signal of each cell to activate, at the next clock cycle, the enabled cells in the array based on the row mask signal and column mask signal.

In another embodiment of the invention, a method for saving power in an M×N array of processor cells, wherein each cell is configured to execute a context instruction when active, includes masking the array to enable a subset of cells of the array, activating each enabled cell to execute the context instruction, and disabling each unmasked cell in the array, such that each disabled cell does not consume dynamic power.

In yet another embodiment of the invention, a power-saving arrangement for an M×N array of processor cells includes a row mask register configured to provide a row mask signal for enabling selected cells in each row of the array, and a column mask register configured to provide a column mask signal for enabling selected cells in each column of the array. The arrangement also includes a clock circuit, connected to supply each cell with a clock signal, each clock signal being gated with the row mask signal and column mask signal to activate the enabled cells upon a new clock cycle.

In still yet another embodiment of the invention, a power saving arrangement for an M×N array of processor cells includes a mask circuit for generating a mask signal for masking a portion of the cells in the array, and a clock for providing a clock signal, the clock signal being gated with the mask signal to activate the masked cells upon a new clock cycle.

Selectively enabling and disabling cells in the array configures the array for a particular processing application, yet reduces power consumption depending on the application by powering only enabled and activated cells, and preventing dynamic power from being consumed by disabled cells.

DETAILED DESCRIPTION OF THE PREFERRED EMBODIMENTS

As described above, power consumption by an array of processor cells can be inefficiently large. Even while a particular cell is not actively processing data, the cell may still have its registers clocked and/or inputs changing. Reducing power consumption by a processor is an important goal toward achieving smaller power supplies, both physically and electrically for the processor. In such a case, the processor's utility in certain applications is enhanced.

Figure 1:
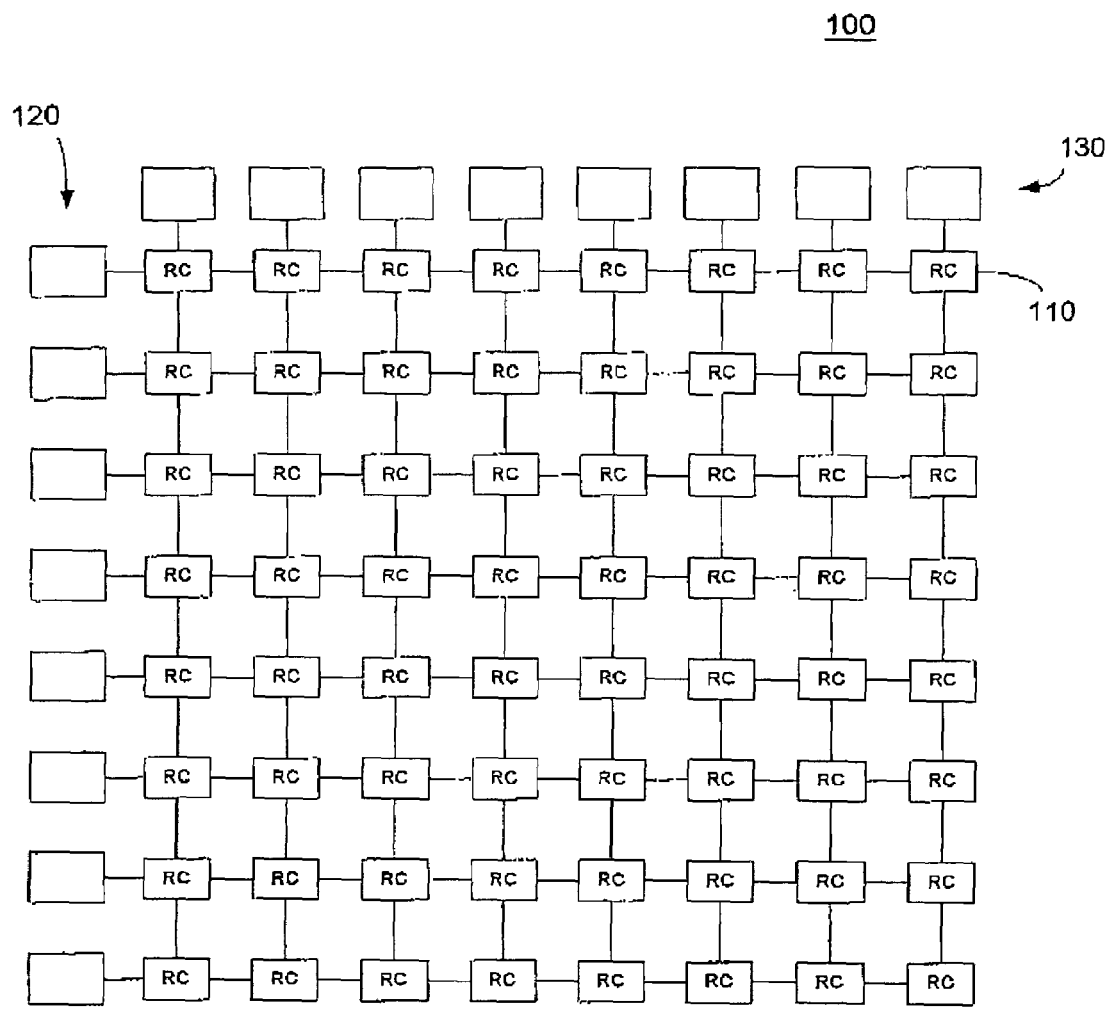
FIG. 1 shows a dynamically reconfigurable processing architecture including an M×N array of reconfigurable cells.

FIG. 1 shows a dynamically reconfigurable processing structure 100 suitable for use with embodiments of the invention. The processing structure 100 includes an M row×N column array of reconfigurable cells 110. In one embodiment, the M×N array is an 8×8 array of cells 110. Each cell 110 includes reconfigurable processing and logic elements which, when programmed, execute one or more logical functions. Each row M is connected to a row context memory 120. The row context memory 120 provides the configuration data to instruct all cells 110 in each row. Each column N is connected to a column context memory 130. The column context memory is configured to provide instructions to all cells 110 in each column. Thus, a row context from the row context memory 120 is gated with a column context from the column context memory 130 at each cell 110, to address and instruct the particular cell 110.

Figure 2:
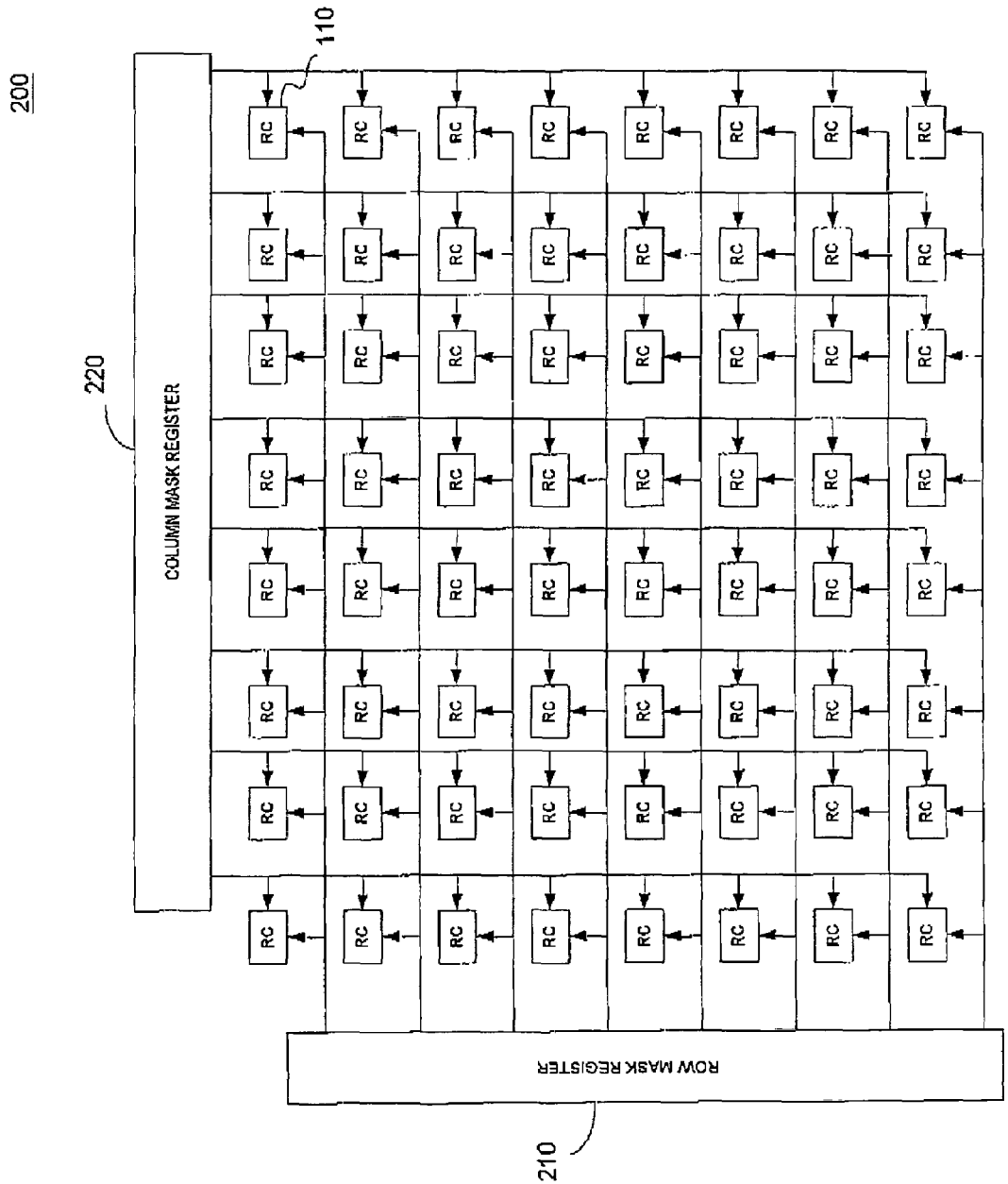
FIG. 2 depicts an M×N array of reconfigurable cells with enable registers.

FIG. 2 shows a processor array 200 with an arrangement for reducing power consumption in the array, according to an embodiment of the invention. An M-bit row mask register 310 is connected to the cells 110 in each row of the M×N array. An N-bit column mask register 320 is connected to the cells 110 in each column of the M×N array. A M-bit word from the row mask register is combined with an N-bit word from the column mask register to mask a portion of the cells in the array 200.

The masked portion of cells is enabled for operation, while the remaining unmasked cells are disabled. The disabled cells are effectively switched off and do not consume dynamic power while the masked cells are activated and operate. The mask can be updated at each cycle, if needed. For a particular cell to be enabled, both corresponding bit lines from the row and column mask registers 210 and 220 must carry a logically active signal, such as a logical "1" for example, depending on a desired convention. Thus, by individually reconfiguring cells, including enabling or disabling cells or a subset of cells of the array, power savings is achieved according to the specific application at hand accomplished by the masked and active cells.

Figure 3:
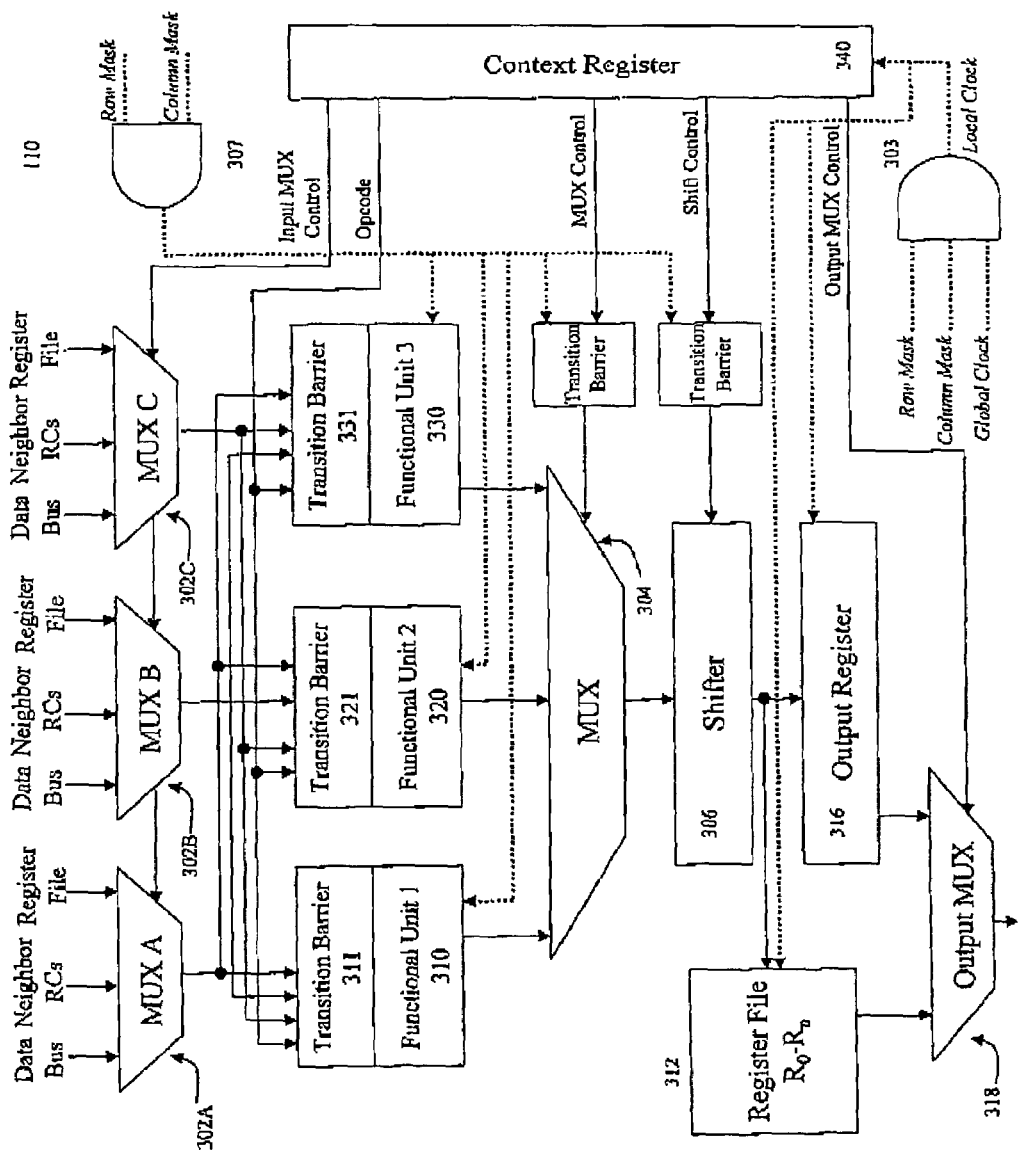
FIG. 3 illustrates an internal structure of one reconfigurable cell according to an embodiment of the invention.

FIG. 3 illustrates the internal structure of one cell 110. In an embodiment, the cell 110 includes one or more functional units 310, 320 and 330. While cell 100 is shown as having three functional units, the number of functional units is merely exemplary, and those having skill in the art would recognize that any combination of functional units can be used within the teachings of the present invention. A combination of active functional units 310, 320 and/or 330 defines an operation of the cell, and represents a logical function executed by the cell 110 during a processing cycle. Suitable functional units can include, without limitation, a Multiply-and-Accumulate (MAC) functional unit, an arithmetic unit, and a logic unit. Other types of functional units for performing functions are possible. The functional units 310, 320 and/or 330 are configured within the cell 110 in a modular fashion, in which functional units can be added or removed without needing to reconfigure the entire cell 110. In particular, by adding functional units, a range of operations of the cell 110 is expandable and scalable. The modular design of the exemplary embodiment also makes decoding of the function easier.

The functional units are controlled and activated by a context register 340. The context register 340 latches a context instruction from the row context memory or the column context memory upon each processing cycle, and provides the configuration data to the appropriate functional unit(s). Depending upon the structure and logic of the group of functional units, and based on the context of the cell, more than one functional unit can be activated at a time.

Each cell 110 contains a storage register 312 for temporarily storing the functional unit computation results. In one embodiment, the results from each functional unit multiplexed together by multiplexer 304, outputted to a shifter 306, and provided to an output register 316. The data output of the shifter 306 is also provided to the storage register 312, where it is temporarily stored until replaced by a new set of output data from the functional units 310,320 and/or 330. The output register 316 sends the output data to an output multiplexer 318, from which the output data, representing a processing result of the reconfigurable cell, is sent to either the data bus, to a neighboring cell, or both.

A row mask signal and a column mask signal are gated with a clock signal at AND gate 303, for controlling all of the sequential logic elements within the cell 110. The row mask signal and the column mask signal is gated at AND gate 307, for activating transition barriers 311, 321, and 331, which in turn prevent input changes from propagating to the internal components. At the same time, all the clocks to the registers, including the context register 340, are disabled. As a result, no dynamic power is consumed in the cell and the cell does not process any data. The row mask signal and the column signal thus control the flow of data to be operated upon by the cell 110.

The row mask signal and the column mask signal are provided by the row and column mask registers 210 and 220, respectively as shown in FIG. 2. By selectively enabling a subset of cells 110 in the array, it is possible to scale the amount of power consumed, such that the consumption of power can be controlled, particularly when needed, such as in the power scarcity, etc.

The reconfigurable cells in an array are interconnected according to one or more hierarchical schemes. In one exemplary embodiment, for an 8×8 array for example, cells within a quadrant, i.e. each group of 4×4 cells, are fully connected in a row or column. Further, cells in adjacent quadrants are connected via specially-configured fast lanes that enable a cell in one quadrant to broadcast function results to all cells in an adjacent quadrant. Thus, the subset of cells that are masked and enabled may follow some hierarchical scheme, or can be randomly or programmatically enabled.

Other embodiments, combinations and modifications of this invention will occur readily to those of ordinary skill in the art in view of these teachings. Therefore, this invention is to be limited only be the following claims, which include all such embodiments and modifications when viewed in conjunction with the above specification and accompanying drawings.

The invention claimed is:

1. A method for conserving power for operating an M row×N column array of processor cells, comprising:
providing a row mask signal configured to enable selected cells in each row of the array;
providing a column mask signal configured to enable selected cells in each column of the array; and
gating the row mask signal and column mask signal with a clock signal of each cell to activate, at the next clock cycle, the enabled cells in the array based on the row mask signal and column mask signal.

2. The method of claim 1, further comprising broadcasting a context instruction to each enabled cell.

3. The method of claim 2, further comprising executing, during the clock cycle, the context instruction with only the activated cells in the array.

4. The method of claim 1, further comprising updating the row mask signal and the column mask signal during each clock cycle.

5. A method for saving power in an M×N array of processor cells, wherein each cell is configured to execute a context instruction when active, the method comprising:
masking an M×N array of processor cells using a plurality of control signals to enable a subset of cells of the array;
activating each enabled cell to execute the context instruction; and
disabling each unmasked cell in the array, such that each disabled cell does not consume power.

6. A power-saving arrangement for an M×N array of processor cells, comprising:
a row mask register configured to provide a row mask signal for enabling selected cells in each row of the array;
a column mask register configured to provide a column mask signal for enabling selected cells in each column of the array; and
a clock circuit, connected to supply each cell with a clock signal, each clock signal being gated with the row mask signal and column mask signal to activate the enabled cells upon a new clock cycle.

7. The arrangement of claim 6, wherein the row mask register is an M-bit register.

8. The arrangement of claim 6, wherein the column mask register is an N-bit register.

9. The arrangement of claim 6, further comprising a mask generator for generating a mask signal to the row mask register and the column mask register.

10. The arrangement of claim 6, further comprising a context instruction generator for generating and supplying a context instruction to each enabled cell for execution when the cell is activated.

11. A power saving arrangement for an M×N array of processor cells, comprising:
   a mask circuit for generating a mask signal for masking a portion of the cells in the array; and
   a clock for providing a clock signal, the clock signal being gated with the mask signal to activate the masked cells upon a new clock cycle.

12. The arrangement of claim 11, wherein the mask circuit further comprises:
   a row mask register connected to each row of cells; and
   a column mask register connected to each column of cells.

13. The arrangement of claim 12, wherein the mask signal includes an M-bit row mask signal and an N-bit column mask signal.

14. The arrangement of claim 13, wherein the row mask signal and column mask signal are gated together at an input to each cell.

15. The arrangement of claim 11, wherein the mask signal is configured to enable the masked cells.

* * * * *